United States Patent
Iraki et al.

(10) Patent No.: US 11,098,760 B2
(45) Date of Patent: Aug. 24, 2021

(54) SELF-POSITIONING SCREW JOINT

(71) Applicant: Sumitomo Riko Company Limited, Komaki (JP)

(72) Inventors: Youssef Iraki, Bas Hersfeld (DE); Martin Gromes, Steinau (DE)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 286 days.

(21) Appl. No.: 16/040,875

(22) Filed: Jul. 20, 2018

(65) Prior Publication Data
US 2019/0032712 A1 Jan. 31, 2019
US 2020/0191202 A9 Jun. 18, 2020

(30) Foreign Application Priority Data

Jul. 26, 2017 (DE) .......................... 102017007051.2

(51) Int. Cl.
| | |
|---|---|
| *F16B 41/00* | (2006.01) |
| *F16B 37/04* | (2006.01) |
| *F16C 33/08* | (2006.01) |
| *F16B 37/00* | (2006.01) |
| *F16B 37/06* | (2006.01) |
| *F16C 17/02* | (2006.01) |

(52) U.S. Cl.
CPC .............. *F16C 33/08* (2013.01); *F16B 37/00* (2013.01); *F16B 37/068* (2013.01); *F16B 41/002* (2013.01); *F16C 17/02* (2013.01)

(58) Field of Classification Search
CPC .... F16B 41/002; F16B 37/068; F16B 37/041; Y10T 403/1616; Y10T 403/1642

USPC .................................. 411/999, 175, 18, 338
See application file for complete search history.

(56) References Cited

U.S. PATENT DOCUMENTS

| | | | | |
|---|---|---|---|---|
| 2,544,304 A * | 3/1951 | Eckenbeck | ............ | F16B 37/122 411/180 |
| 4,863,326 A * | 9/1989 | Vickers | .................. | F16B 5/0266 411/105 |
| 5,766,019 A * | 6/1998 | Matsumoto | ............ | B60R 16/027 439/15 |
| 6,460,296 B1 * | 10/2002 | Arquevaux | ............ | E05F 11/382 411/119 |
| 8,615,889 B2 * | 12/2013 | Martinsson | ............ | F16B 37/043 30/383 |

(Continued)

FOREIGN PATENT DOCUMENTS

| CN | 104518358 A | 4/2015 |
|---|---|---|
| CN | 106608323 A | 5/2017 |

(Continued)

*Primary Examiner* — Flemming Saether
(74) *Attorney, Agent, or Firm* — Armstrong Teasdale LLP

(57) ABSTRACT

The disclosure relates to a vehicle component with a bearing bush system for mounting the vehicle component on a fastening portion of a vehicle. The vehicle component includes a bearing bush which has an internal thread, and a bearing bush receptacle which is configured to at least partially accommodate the bearing bush, wherein the bearing bush is configured to be at least partially shifted in the bearing bush receptacle by means of an interaction between the internal thread of the bearing bush and a bearing screw, in order to enter into engagement with the fastening portion. The disclosure furthermore relates to the use of the vehicle component, and to a method for the mounting of the vehicle component.

6 Claims, 5 Drawing Sheets

(56) References Cited

U.S. PATENT DOCUMENTS

| | | | | |
|---|---|---|---|---|
| 9,194,419 B2* | 11/2015 | Martin | ............... | B29C 66/742 |
| 9,297,407 B2* | 3/2016 | Pudvah | ............... | F16B 5/02 |
| 2013/0145605 A1* | 6/2013 | Kajimura | ............ | F16B 37/047 |
| | | | | 29/525.02 |

FOREIGN PATENT DOCUMENTS

| | | | |
|---|---|---|---|
| DE | 102012016495 A1 | 2/2014 | |
| FR | 2781006 A1 | 1/2000 | |

\* cited by examiner

SELF-POSITIONING SCREW JOINT

CROSS REFERENCE TO RELATED APPLICATIONS

This application claims the benefit of DE Patent Application No. 10 2017 007 051.2 filed Jul. 26, 2017, which is hereby incorporated by reference in its entirety.

BACKGROUND

The disclosure relates to a vehicle component with a bearing bush system for mounting the vehicle component on a fastening portion of a vehicle, to the use of such a vehicle component for mounting the vehicle component, and to a method for the mounting of the vehicle component on the fastening portion of the vehicle.

The field of the disclosure resides in the field of mountings for vehicle components, in particular in the field of bearing bush systems. In modern vehicles, a multiplicity of very different components are mounted and fastened. However, this leads in some cases to the available construction space for the installation of the components either being greatly limited by parts of the vehicle itself or by adjacent components. The necessary space is therefore often missing for mounting components on the vehicle, for example by tightening a screw and a nut on both sides. This can be circumvented by use being made of complex systems which, by means of special tools or methods, provide a person skilled in the art with sufficient space for the installation. Alternatively, components can also be attached by methods, for example adhesive bonding, clamping or welding, wherein the durability of such a fastening is often below that of a screw connection, or wherein a possible removal or exchange of the components is made considerably more difficult.

BRIEF DESCRIPTION

The embodiments described herein provide a simple and cost-effective mounting system for vehicle components on a vehicle with simplified installation/removal properties.

This is achieved in particular by a vehicle component with a bearing bush system for mounting the vehicle component on a fastening portion of a vehicle, by the use of such a vehicle component for mounting the vehicle component, and by a method for the mounting of the vehicle component on the fastening portion of the vehicle, in each case as claimed in the independent claims. Example embodiments are the subject matter of the dependent claims.

One aspect relates to a vehicle component with a bearing bush system for mounting the vehicle component on a fastening portion of a vehicle. The vehicle component includes a bearing bush which has an internal thread, and a bearing bush receptacle which is configured to at least partially accommodate the bearing bush, wherein the bearing bush is configured to be at least partially shifted in the bearing bush receptacle by means of an interaction between the internal thread of the bearing bush and a bearing screw, in order to enter into engagement with the fastening portion.

The vehicle component can be any component of a vehicle, in particular a radiator component or, for example, a headlight component. The fastening portion can be any portion of the vehicle, in particular a portion of the body. The fastening portion can be designed substantially in the manner of a plate for this purpose and furthermore can have at least one fastening hole. The mounting of the vehicle component with the bearing bush system may be of releasable design, wherein "releasable" in this context means that a release or removal of the vehicle component from the fastening portion is possible after the mounting.

The bearing bush has an internal thread, wherein an axis of the bearing bush may run substantially parallel to an axis of the internal thread. For this purpose, the bearing bush can be of substantially cylindrical or cylinder-shape design, but is not limited to such a shape. Alternatively, other shapes, for example cuboidal, are also possible. The bearing bush can be formed from a metal or an alloy, for example steel, or from a plastic or composite material. The internal thread can extend here completely through the bearing bush, as a result of which the internal thread does not limit a selection of the length of the bearing screw used. Alternatively, the internal thread can extend only partially through the bearing bush. By this means, the internal thread and the bearing screw are advantageously protected along an axial direction against external materials or corrosion. The internal thread can be designed here in a manner corresponding to any type of thread, for example as a V thread, pipe thread or trapezoidal thread.

A radial outer surface of the bearing bush can be at least partially of substantially rotationally symmetrical design. In this context, the radial outer surface can be regarded as the surface which lies opposite the internal thread in the radial direction with respect to the axis of the bearing bush. In this connection, "substantially rotationally symmetrical" means that rotation of the bearing bush about a multiplicity of different angles about the axis of the bearing bush represents the bearing bush and/or the radial outer surface on the latter. By this means, a precise alignment of the bearing bush for accommodating it in the bearing bush receptacle can be avoided, as a result of which a process for producing the bearing bush system is simplified.

The bearing bush can be formed in multiple pieces. The bearing bush may be formed integrally, as a result of which the bearing bush is protected from being lost and the process for producing the bearing bush system is simplified.

The bearing bush receptacle can be configured in the vehicle component as a depression or bore, and may be formed in a shape corresponding to the shape of the bearing bush. The bearing bush receptacle can be formed from the material of the vehicle component. The bearing bush receptacle may furthermore be designed to substantially completely accommodate the bearing bush, as a result of which an excess length of the bearing bush on the vehicle component can be avoided. Furthermore after the bearing bush is accommodated in the bearing bush receptacle, the axis of the bearing bush may run substantially parallel to an axis of the bearing bush receptacle; particularly, the axis essentially of the bearing bush may correspond to the axis of the bearing bush receptacle.

The interaction between the internal thread of the bearing bush and the bearing screw may correspond to screwing of the bearing screw into the internal thread. By means of the screwing of the bearing screw into the internal thread, the bearing bush can be shifted with respect to the bearing screw along an axis of the bearing screw, wherein the bearing bush system is configured such that the bearing bush is furthermore additionally shifted with respect to the bearing bush receptacle along an axis of the bearing screw. By means of this shifting, the bearing bush enters into engagement with the fastening portion, wherein the bearing bush may enter into engagement with the fastening hole.

In a mounted operating state, in which the bearing screw is screwed to the internal thread and the bearing bush is in engagement with the fastening portion, bearing bush and bearing screw may extend through the fastening portion. By this means, a release of the mounted vehicle component from the fastening portion is prevented by the bearing screw and the bearing bush. In addition, the bearing bush protects a thread of the bearing screw, which thread could be damaged by impact of the fastening portion against the bearing screw during the mounting of the vehicle component. Conversely, this advantageously also protects the fastening portion which could be damaged by impact of the bearing screw against the fastening portion during the mounting of the vehicle component. Mutual wear of the bearing screw and of the fastening portion is therefore advantageously avoided or reduced.

The bearing screw may be screwed to the internal thread from a side of the fastening portion which is not a side of the fastening portion on which the bearing bush is formed.

In a further embodiment, the vehicle component furthermore includes a holding plate, wherein the holding plate is designed such that the fastening portion is at least partially mounted between the bearing bush receptacle and the holding plate, and, following the interaction with the internal thread of the bearing bush, the bearing screw extends through the holding plate. By this means, the vehicle component is advantageously mounted on the fastening portion on both sides with respect to the fastening portion. Furthermore, the vehicle component can thereby be pressed on both sides against the fastening portion by means of the interaction between bearing screw and internal thread, as a result of which secure mounting is made possible. The holding plate can be formed here from the same material as the vehicle component, wherein the holding plate can additionally be of reinforced design, as a result of which an inadvertent breaking off of the holding plate can be avoided. In one embodiment, following the interaction of the bearing screw with the internal thread of the bearing bush, the bearing bush at least partially extends through the holding plate, as a result of which a secure seat is furthermore made possible.

In a further embodiment, the bearing bush includes at least one fixing portion and the bearing bush receptacle includes at least one fixing surface, wherein, upon the interaction of the bearing screw with the internal thread of the bearing bush, the fixing portion enters into engagement with the at least one fixing surface in order to produce a rotational securing of the bearing bush within the bearing bush receptacle. The at least one fixing portion may not extend here along the axis of the bearing bush over an entire length of the bearing bush. Furthermore the at least one fixing portion may extend along the axis of the bearing bush over a maximum of approximately 80%, even more particularly over a maximum of approximately 60%, and most particularly over a maximum of approximately 40% of the length of the bearing bush. The at least one fixing portion may be designed to at least partially encircle the bearing bush radially with respect to the axis of the bearing bush. The at least one fixing portion can furthermore be designed to protrude at least partially radially from the bearing bush.

The at least one fixing surface may not extend here along the axis of the bearing bush receptacle over an entire length of the bearing bush receptacle. Furthermore, the at least one fixing surface may extend along the axis of the bearing bush receptacle over a maximum of approximately 80%, even more particularly over a maximum of approximately 60%, most particularly over a maximum of approximately 40% of the length of the bearing bush receptacle. In a-one embodiment, the at least one fixing surface and the at least one fixing portion are designed such that, in a mounted operating state, in which the vehicle component is mounted on the fastening portion, the at least one fixing portion substantially completely overlaps the at least one fixing surface, and/or the at least one fixing surface substantially completely overlaps the at least one fixing portion. The at least one fixing surface may be designed to at least partially encircle the bearing bush receptacle radially with respect to the axis of the bearing bush receptacle. The at least one fixing surface can furthermore be designed to at least partially protrude radially from the bearing bush receptacle.

The rotational securing is configured here to prevent or to block a rotation of the bearing bush about the axis of the bearing bush in the mounted operating state. For this purpose, the at least one fixing surface and the at least one fixing portion can enter into engagement with each other, for example by means of a friction fit, interference fit, fusing and/or chemical surface reactions. In one embodiment, the fixing portion is configured, upon the interaction of the bearing screw with the internal thread of the bearing bush, to enter into engagement with the at least one fixing surface by cutting or biting into same. For this purpose, the at least one fixing portion can have one or more long wedges or teeth which are pulled into the material of the at least one fixing surface by the interaction of bearing screw and internal thread. By this means, a rotationally secure fit of the bearing bush and a simple process for producing the bearing bush system are ensured.

In a further embodiment, the bearing bush receptacle has at least one holding element which is designed to hold the bearing bush in the bearing bush receptacle prior to the interaction of the bearing screw with the internal thread of the bearing bush, wherein the at least one holding element may be of elastic design. The state in which the bearing bush is at least partially accommodated in the bearing bush receptacle, but the bearing bush has not been shifted by the interaction of the bearing screw with the internal thread of the bearing bush, constitutes an unmounted operating state. The at least one holding element can be formed here at an opening of the bearing bush receptacle, and thereby prevents the bearing bush from falling out of the bearing bush receptacle. The vehicle component together with the bearing bush system can therefore be efficiently handled in the unmounted operating state without the bearing bush falling out of the bearing bush receptacle. By means of the elastic design of the at least one holding element, a simple construction of the bearing bush receptacle can be ensured. The at least one holding element can be designed as a protruding block or as a latching hook which is latchable to the bearing bush.

In a further embodiment, the bearing bush has at least one first stop surface, the normal vector of which runs substantially parallel to an axis of the bearing bush, wherein the bearing bush receptacle has at least one positioning element which is configured, upon the interaction of the bearing screw with the internal thread of the bearing bush to enter into contact with the at least one first stop surface. The shifting of the bearing bush within the bearing bush receptacle can therefore be limited. In addition, by this means, the at least one positioning element can be at least partially clamped between the bearing bush and the fastening portion, as a result of which a secure fit of the vehicle component on the fastening portion is ensured.

In a further embodiment, the bearing bush has, at one end of the bearing bush, at least one second stop surface, the normal vector of which runs substantially parallel to an axis of the bearing bush, wherein the at least one second stop surface is designed, upon the interaction of the bearing screw with the internal thread of the bearing bush, to enter into contact with a screw head of the bearing screw. By this means, the shifting of the bearing bush within the bearing bush receptacle can be limited. Such limiting makes it possible to prevent overtensioning of the bearing screw, as a result of which in particular the vehicle component and the fastening portion are protected against damage. In addition, the screw head of the bearing screw can end tightly with the second stop surface, and therefore can protect the internal thread against corroding materials. In one embodiment, a diameter of the screw head can be selected variably. A large diameter of the screw head can be selected here such that a large torque is made possible during the interaction. In addition, the precise mounting of sensitive components is thereby made possible.

In a further embodiment, the bearing bush system furthermore includes a latching device which is configured to block or to prevent a release of the bearing screw following the interaction of the bearing screw with the internal thread of the bearing bush. By this means, a permanently secure mounting of the vehicle component on the fastening portion is made possible. The latching device can bring this about by means of latching, a fluting and/or by the use of intermediate disks.

In a further embodiment, the bearing bush system furthermore includes a pretensioning device. The pretensioning device is designed in order to pretension the bearing screw/bearing bush system, as a result of which a possible release of the bearing screw is prevented or blocked by the bearing screw being placed in the internal thread. The pretensioning device can be designed as a disk ring, snap ring and/or spring ring.

A further aspect of the disclosure relates to the use of a vehicle component with a bearing bush system for mounting the vehicle component on a fastening portion of a vehicle. The use includes providing the vehicle component with a combination of the above-described features, and interacting of the bearing screw with the internal thread of the bearing bush in the bearing bush receptacle for the at least partial shifting of the bearing bush, as a result of which the bearing bush at least partially enters into engagement with the fastening portion.

A further aspect of the disclosure relates to a method for the mounting of a vehicle component with a bearing bush system on a fastening portion of a vehicle. The method includes providing a bearing bush which has an internal thread, accommodating the bearing bush in a bearing bush receptacle of the vehicle component, and interacting of a bearing screw with the internal thread of the bearing bush in the bearing bush receptacle for the at least partial shifting of the bearing bush, as a result of which the bearing bush at least partially enters into engagement with the fastening portion.

The vehicle component, the bearing bush system, the fastening portion, the bearing bush, the bearing bush receptacle and the bearing screw here can have any combination of the abovementioned features.

The interaction between the internal thread of the bearing bush and the bearing screw may correspond to screwing of the bearing screw into the internal thread. By means of the screwing of the bearing screw into the internal thread, the bearing bush is at least partially shifted with respect to the bearing screw along an axis of the bearing screw, wherein the bearing bush system is configured such that the bearing bush is furthermore additionally at least partially shifted with respect to the bearing bush receptacle along an axis of the bearing screw. By means of this shifting, the bearing bush at least partially enters into engagement with the fastening portion, wherein the bearing bush may enter into engagement with the at least one fastening hole. In a mounted operating state, in which the bearing screw is screwed to the internal thread and the bearing bush is in engagement with the fastening portion, bearing bush and bearing screw may at least partially extend through the fastening portion. By this means, a release of the mounted vehicle component from the fastening portion is prevented by the bearing screw and the bearing bush. In addition, the bearing bush protects a thread of the bearing screw, which thread could be damaged in particular by impact of the fastening portion against the bearing screw during the mounting of the vehicle component. Conversely, this advantageously also protects the fastening portion which could be damaged in particular by impact of the bearing screw against the fastening portion during the mounting of the vehicle component. A mutual wear of the bearing screw and of the fastening portion is therefore advantageously avoided or reduced.

In a further embodiment, the interaction of the bearing screw with the internal thread of the bearing bush can furthermore include fixing the bearing bush in the bearing bush receptacle, wherein a rotation of the bearing bush about the axis of the bearing bush is prevented or blocked in the mounted operating state. For this purpose, the at least one fixing surface and the at least one fixing portion can at least partially enter into engagement with each other, for example by means of a friction fit, interference fit, fusing and/or chemical surface reactions. In one embodiment, the fixing portion is designed, upon interaction of the bearing screw with the internal thread of the bearing bush, to enter into engagement with the at least one fixing surface by cutting or biting into same.

In a further embodiment, the accommodating of the bearing bush in the bearing bush receptacle includes holding of the bearing bush in the bearing bush receptacle by at least one holding element which is designed to hold the bearing bush in the bearing bush receptacle prior to the interaction of the bearing screw with the internal thread of the bearing bush, wherein the at least one holding element may be of elastic design.

In a further embodiment, the interaction includes clamping of the vehicle component and the fastening portion, wherein the bearing bush has at least one first stop surface, the normal vector of which runs substantially parallel to an axis of the bearing bush, wherein the bearing bush receptacle has at least one positioning element which is configured, upon the interaction of the bearing screw with the internal thread of the bearing bush to enter at least partially into contact with the at least one first stop surface. In addition, the shifting of the bearing bush within the bearing bush receptacle can be limited.

In a further embodiment, the interaction includes sealing of the internal thread by a screw head of the bearing screw, wherein the bearing bush has, at one end of the bearing bush, at least one second stop surface, the normal vector of which runs substantially parallel to an axis of the bearing bush, wherein the at least one second stop surface is designed, upon the interaction of the bearing screw with the internal thread of the bearing bush, to enter at least partially into contact with the screw head of the bearing screw. By this means, the shifting of the bearing bush within the bearing bush receptacle can be limited. Such a limiting makes it possible to prevent overtensioning of the bearing screw, as a result of which in particular the vehicle component and the fastening portion are protected against damage.

In a further embodiment, the interaction furthermore includes pretensioning of the bearing screw/bearing bush system by a pretensioninig device in order to prevent a possible release of the bearing screw by the bearing screw being placed in the internal thread. The pretensioning device can be designed as a disk ring, snap ring and/or spring ring.

Unless is apparent otherwise from the description, "substantially parallel" should be understood as meaning parallel and/or with slight deviations due to production.

BRIEF DESCRIPTION OF THE DRAWINGS

Aspects of the disclosure are described in more detail below with reference to exemplary embodiments which are illustrated in figures, in which.

DETAILED DESCRIPTION

Figure 1A:
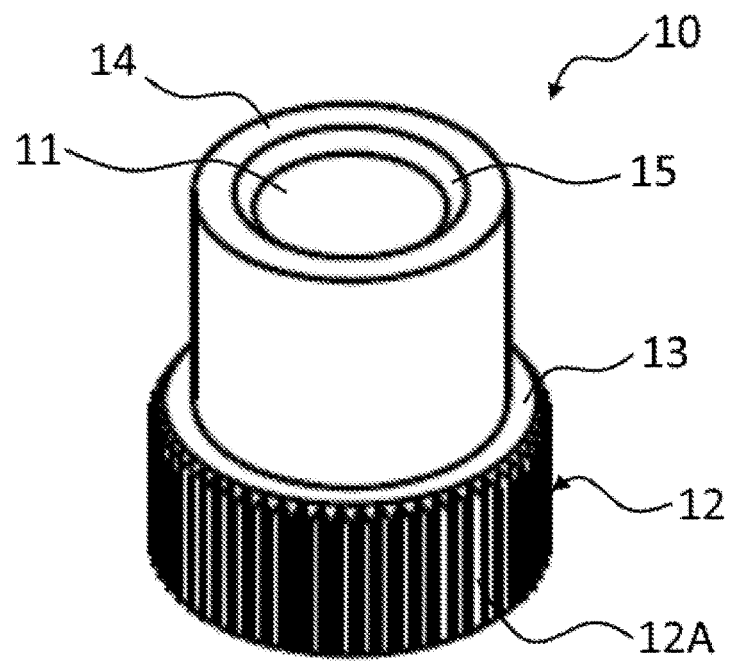
FIG. 1A shows a perspective view of an embodiment of the bearing bush.

FIG. 1A shows a perspective view of a bearing bush 10 according to one embodiment. The bearing bush 10 is of substantially cylinder-shape design and includes a bore which runs through the bearing bush 10 and is provided with an internal thread 11. The bore of the bearing bush 10 can alternatively be provided without or at least only partially with an internal thread 11. At least the inner surface of the bore can be formed here from a softer material than the complementary bearing screw 40 (see FIG. 3 et seq.), and therefore, as the bearing screw 40 is screwed into the bore of the bearing bush 10, said bearing screw bites or cuts into the inner surface of the bore of the bearing bush 10.

The bearing bush 10 furthermore has an encircling fixing portion 12 which protrudes in relation to the rest of the bearing bush 10 radially with respect to an axis A1 of the bearing bush 10. The fixing portion 12 is formed here with a multiplicity of wedges or wedge-shaped projections 12A which extend along the fixing portion 12 parallel to the axis A1 of the bearing bush 10. The wedges 12A are configured in particular to at least partially bite into a complementary fixing surface 22 of a bearing bush receptacle 21 (see FIG. 2 et seq.). The bearing bush 10 furthermore has a first stop surface 13, the normal vector of which may extend substantially along the axis A1 of the bearing bush 10, and wherein the first stop surface 13 encircles the bearing bush 10. In the embodiment shown, the fixing portion 12 is adjacent to the first stop surface 13. In order to simplify cutting in or biting in of the wedges 12A of the fixing portion 12, at the boundary with the first stop surface 13 at least one of the wedges 12A can have an angled surface, the normal vector of which forms an acute angle with the normal vector of the first stop surface 13. In a further embodiment, the normal vector of the first stop surface 13 can form an acute angle with the axis A1 of the bearing bush 10.

FIG. 1A furthermore shows a second stop surface 14 of the bearing bush 10, which stop surface is formed at one end of the bearing bush 10 and has a normal vector which may extend substantially parallel to the axis A1 of the bearing bush 10. The second stop surface 14 is adjacent to a guide region, in particular in the form of an oblique wall 15 which at least partially is designed in the manner of a cone or in a tapering manner and separates the second stop surface 14 from the internal thread 11. Such an oblique wall 15 in the manner of a cone permits a more rapid and secure introduction of a complementary bearing screw 40 into the internal thread 11.

Figure 1B:
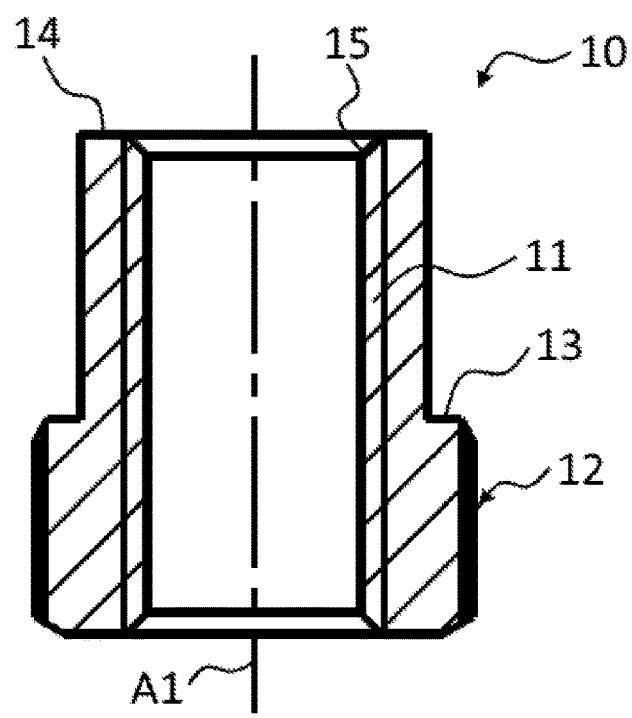
FIG. 1B shows a cross-section view of the bearing bush from FIG. 1A.

FIG. 1B shows a cross-sectional view of the bearing bush 10 from FIG. 1A, wherein in particular the profile of the axis A1 of the bearing bush 10 is shown by way of illustration. FIG. 1B furthermore shows that the bearing bush 10 in particular has at least mirror symmetry with respect to a plane which runs through the axis A1 of the bearing bush 10. An installation process can be simplified by such a design of the bearing bush 10 since a precise alignment of the bearing bush 10 during the introduction of the bearing bush 10 into the bearing bush receptacle 21 can thereby be avoided. The bearing bush 10 can therefore be introduced, in particular even without site contact, into the bearing bush receptacle 21.

Figure 2A:
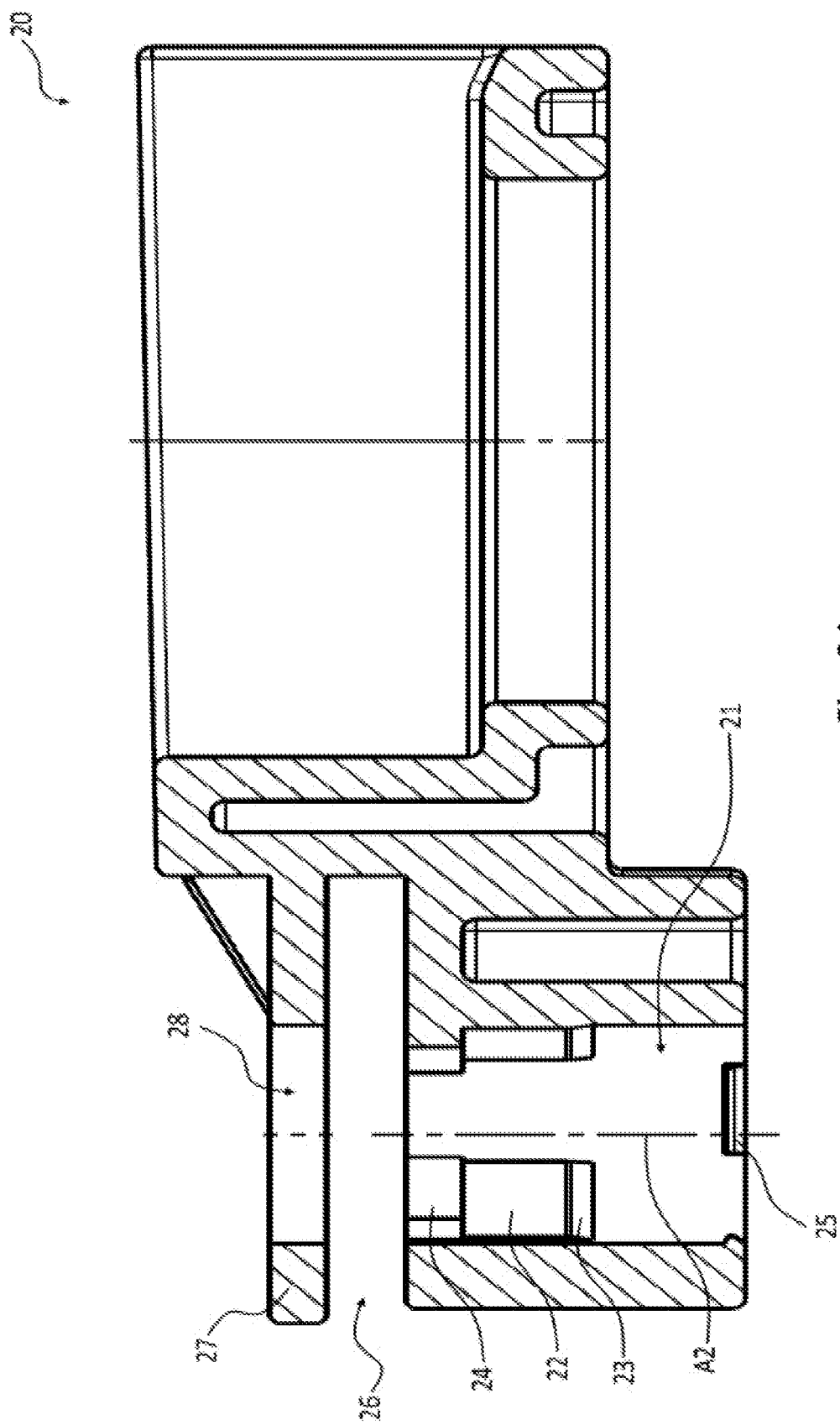
FIG. 2A shows a cross-sectional view of the vehicle component with a bearing bush receptacle.

FIG. 2A shows a cross-sectional view of a vehicle component 20 with a bearing bush receptacle 21 according to one embodiment. In this illustrative example, the vehicle component 20 is configured as a radiator element, and can be formed from a plastic or composite material. However, any other vehicle component is also conceivable. The vehicle component 20 has a bearing bush receptacle 21 which extends through the vehicle component 20. The bearing bush receptacle 21 is designed here substantially cylindrically, and in particular is configured so as to accommodate a bearing bush 10. For this purpose, the bearing bush receptacle 21 has fixing surfaces 22 which protrude inward with a thickness D into the bearing bush receptacle 21 radially with respect to an axis A2 of the bearing bush receptacle 21. The bearing bush receptacle 21 has a multiplicity of (e.g. three) fixing surfaces 22 which are arranged at substantially identical distances in an encircling direction. While such a substantially symmetrical arrangement of the fixing surfaces 22 is not necessary with regard to the function thereof, a symmetrical arrangement can assist good centering of the bearing bush 10 in the bearing bush receptacle 21. The fixing surfaces 22 are designed in particular to enter into engagement with the fixing portion 12 of the bearing bush 10 by said fixing portion cutting or biting into the fixing surfaces 22. To assist the cutting-in or biting process, the fixing surfaces 22 can each have an angled guide portion 23, wherein a normal vector of the fixing surfaces 22 forms an acute angle with a normal vector of the respective guide portion 23.

The bearing bush receptacle 21 furthermore has one or more positioning elements 24 which are designed to enter into contact with the first stop surface 13 in a mounted operating state. The positioning elements 24 are designed here in particular as blocks which protrude inward in the radial direction with respect to the axis A2 of the bearing bush receptacle 21. For this purpose, the positioning elements 24 are arranged at a first opening of the bearing bush receptacle 21, which opening is adjacent to the fastening portion 30 in a mounted operating state (see FIG. 3 et seq.). However, the positioning elements 24 can be arranged at any position within the bearing bush receptacle 21. In the embodiment shown, the positioning elements 24 are substantially directly adjacent to the fixing surfaces 22. In further embodiments, however, arrangements are also possible in which the positioning elements 24 and the fixing surfaces 22 are not directly adjacent to one another and/or are arranged displaced relative to one another in the encircling direction. The arrangement shown can be produced in particular in a simple manner. In the embodiment shown, the number of positioning elements 24 is equal to the number of fixing surfaces 22, wherein different numbers are also possible.

The bearing bush receptacle 21 furthermore has one or more holding elements 25 which are configured to hold the bearing bush 10 in the bearing bush receptacle 21. For this purpose, the holding elements 25 are arranged at an opening of the bearing bush receptacle 21, which opening lies opposite the first opening at which the one or more positioning elements 24 are formed. The holding elements 25 are designed here in particular as wedges or blocks protruding inward in the radial direction with respect to the axis A2 of the bearing bush receptacle 21. In the embodiment shown, three holding elements 25 are formed in the bearing bush receptacle 21, with, however, also fewer or more holding elements 25 being possible. The holding elements 25 can be arranged here in a predetermined relationship to the fixing surfaces 22 or as desired in the encircling direction.

Figure 3:
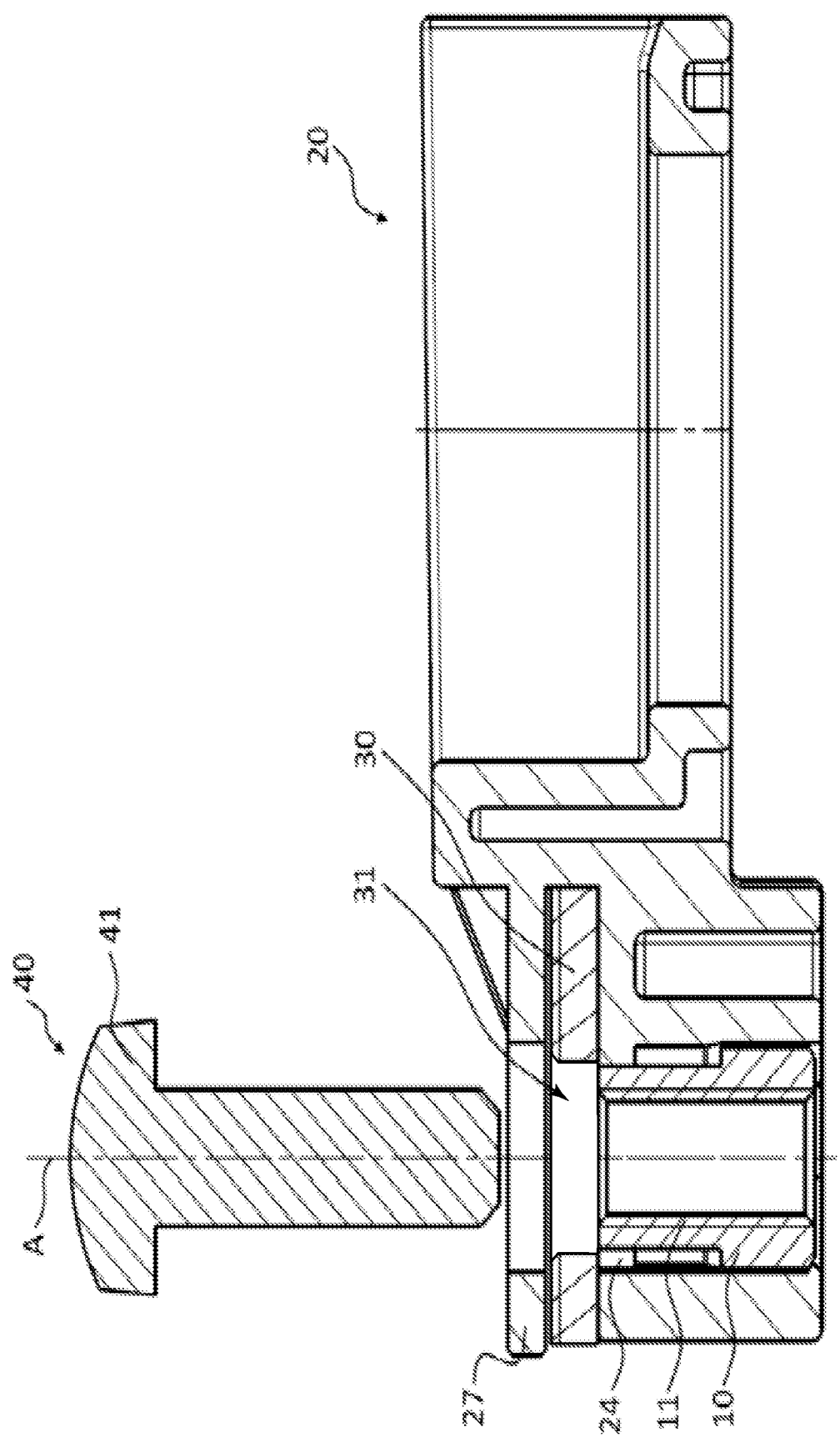
FIG. 3 shows a cross-sectional view of an embodiment of a vehicle component in an unmounted operating state.

The vehicle component 20 furthermore has a fastening portion receptacle 26 which is formed at the first opening of the bearing bush receptacle 21 and is configured to receive or enter into contact with the fastening portion 30 of a vehicle (see FIG. 3 et seq.).

The vehicle component 20 furthermore includes a holding plate 27 which is arranged substantially opposite the bearing bush receptacle 21 with respect to the fastening portion receptacle 26. The holding plate 27 here is in particular part of the vehicle component 20 or is fixedly connected thereto, and can be composed of the same material as the vehicle component 20. The holding plate 27 furthermore includes at least one holding plate opening 28 which is centered with respect to the axis A2 of the bearing bush receptacle 21 and extends through the holding plate 27. The holding plate opening 28 is configured to guide the bearing screw 40 (see FIG. 3 et seq.) and/or can at least partially accommodate the bearing bush 10 in the mounted operating state.

Alternatively, however, the holding plate 27 can also be designed as a separate component which, after the fastening portion 30 has been accommodated in the fastening portion receptacle 26, is connected to the vehicle component 20, for example by adhesive bonding, clamping and/or screwing, such that the fastening portion 30 is mounted between the bearing bush receptacle 21 and the holding plate 27. By this means, greater flexibility and movement clearance can be ensured for the installation of the vehicle component 20.

Figure 2B:
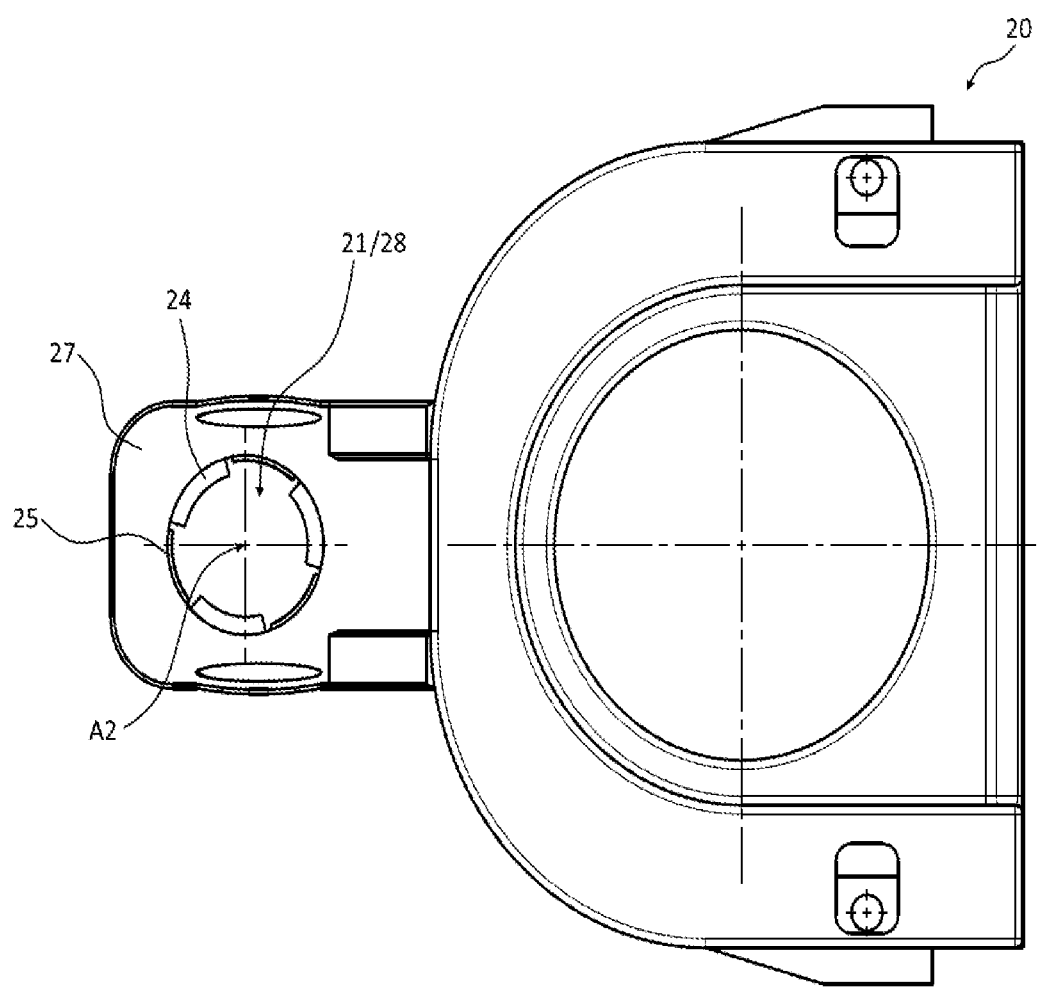
FIG. 2B shows a perspective view of the vehicle component from FIG. 2A along the axis of the bearing bush receptacle.

FIG. 2B shows a perspective view of the vehicle component 20 from FIG. 2A from a viewing direction along the axis A2 of the bearing bush receptacle 21. The arrangement of the holding elements 25 and of the positioning elements 24 in the bearing bush receptacle 21 is emphasized here. Positioning elements 24 and holding elements 25 are in particular in each case formed at equal distances from one another in the bearing bush receptacle 21. In the embodiment shown, the positioning elements 24 and holding elements 25 are furthermore designed in such a manner that there is in particular no overlap between positioning elements 24 and holding elements 25 along the viewing direction. By this means, a process for manufacturing the vehicle component 20, and in particular of the bearing bush receptacle 21, is simplified.

FIG. 3 shows a cross-sectional view of a vehicle component 20 in an unmounted operating state according to one embodiment. The bearing bush 10 is illustrated here as being accommodated in the bearing bush receptacle 21, wherein the axis A1 of the bearing bush 10 and the axis A2 of the bearing bush receptacle 21 are identical in this unmounted operating state, or form the axis A of the bearing bush system. The bearing bush 10 is in particular completely accommodated in the bearing bush receptacle 21 and is held in the bearing bush receptacle 21 by the holding elements 25. In this unmounted operating state, the fixing portion 12 of the bearing bush 10 has not yet entered into engagement with the fixing surfaces 22. The positioning elements 24 are configured to lie substantially from the outside against the bearing bush 10 in the radial direction with respect to the axis A of the bearing bush system. The bearing bush 10 can therefore be precisely guided in the bearing bush receptacle 21 during the interaction between internal thread 11 and bearing screw 40, and a possible tilting of the bearing bush 10 can be prevented.

FIG. 3 furthermore shows a fastening portion 30 of the vehicle, to which fastening portion the vehicle component 20 is intended to be fastened. In this embodiment, the fastening portion 30 is designed substantially in the manner of a plate, for example as a body sheet, and is accommodated in the fastening portion receptacle 26 of the vehicle component 20 between the bearing bush receptacle 21 and the holding plate 27. The fastening portion 30 here has at least one fastening hole 31 which is configured to at least partially accommodate the bearing screw 40. The fastening portion 30 and the fastening hole 31 are designed here in such a manner that the fastening portion 30 enters at least partially into contact with the positioning elements 24 in the unmounted state. Or, the fastening portion 30 and the fastening hole 31 are designed here in such a manner that a largest inner radius of the bearing bush receptacle 21 is larger than a largest inner radius of the fastening hole 31. Furthermore, the fastening hole 31 is designed to at least partially accommodate the bearing bush 10 in a mounted operating state.

FIG. 3 furthermore shows the bearing screw 40 which is illustrated suspended over the bearing bush system. A screw head 41 of the bearing screw 40 is configured here such that a radius or an outer circumference of the screw head 41 is larger than a radius or an inner circumference of the holding plate opening 28. By this means, in a mounted operating state, the screw head 41 and the holding plate 27 can enter into contact in such a manner that the interaction between bearing screw 40 and internal thread 11 shifts the bearing bush 10 within the bearing bush receptacle 21. Furthermore, a substantially uniform contact between screw head 41 and holding plate 27 can make it possible to seal the bearing bush system to the outside and therefore to protect same from penetration of in particular liquid.

The bearing bush 10, the bearing bush receptacle 21, the holding plate opening 28, the fastening hole 31 and the bearing screw 40 are illustrated together in a manner substantially centered along the axis A of the bearing bush system.

Figure 4:
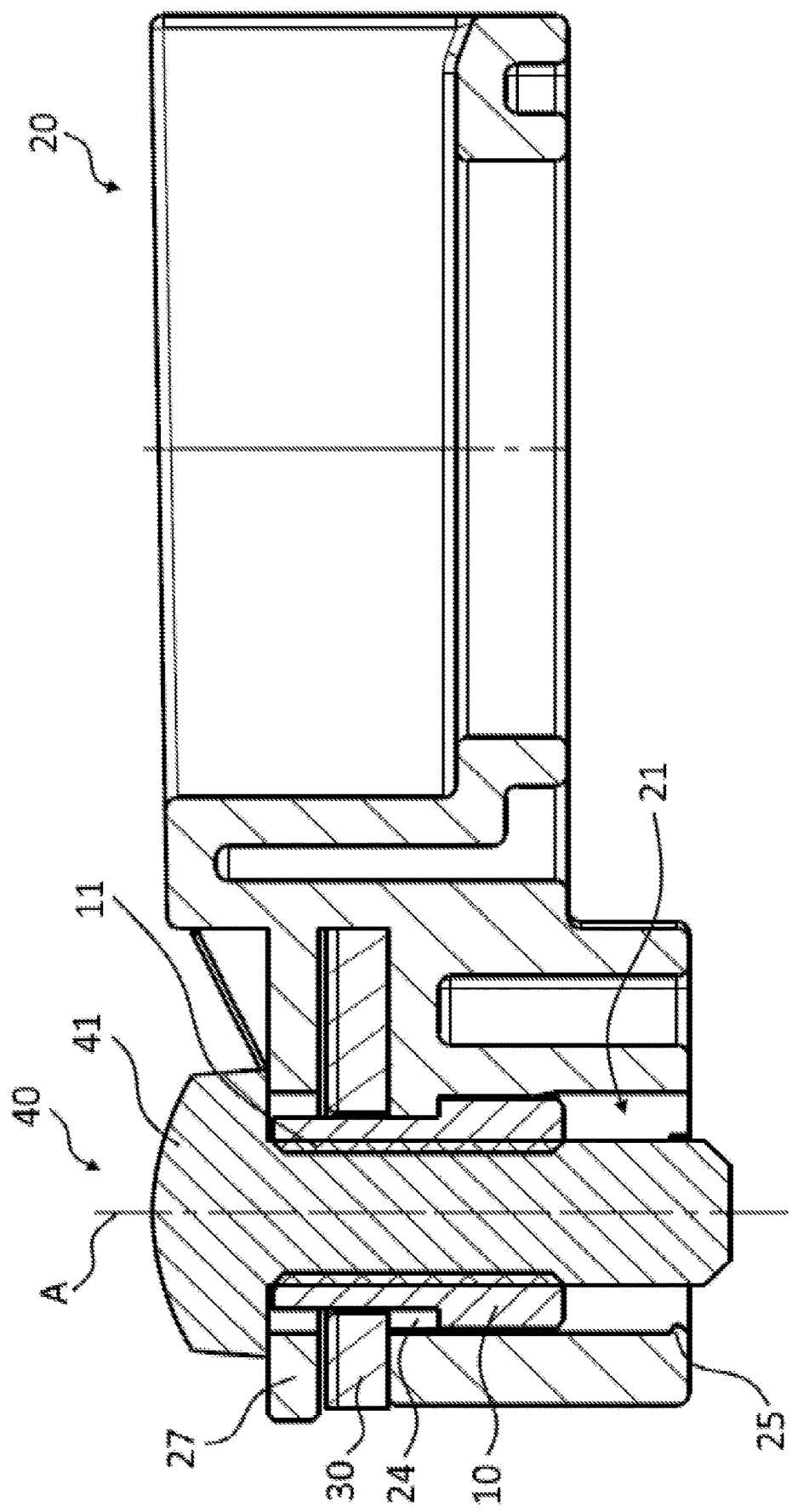
FIG. 4 shows a cross-sectional view of the vehicle component from FIG. 3 in a mounted operating state.

FIG. 4 shows a cross-sectional view of the vehicle component 20 from FIG. 3 in a mounted operating state. In the mounted operating state, the bearing screw 40 is at least partially screwed into the internal thread 11 of the bearing bush 10. By means of this interaction between bearing screw 40 and internal thread 11, the bearing bush 10 has been shifted within the bearing bush receptacle 21, as a result of which the fixing portion 12 has entered into engagement with the fixing surfaces 22, in particular by the fixing portion 12 cutting or biting into the fixing surfaces 22. Alternatively, the fixing portion 12 can also enter into engagement with the fixing surfaces 22 in particular by the fixing surfaces 22 cutting or biting into the fixing portion 12. By means of the fixing surfaces 22 and the fixing portion 12 entering into engagement, a rotational movement of the bearing bush 10 within the bearing bush receptacle 21 during the interaction between bearing screw 40 and internal thread 11 and in the mounted operating state is prevented or blocked. This in particular simplifies the mounting of the vehicle component 20 on the fastening portion 30 since tightening of bearing bush 10 and bearing screw 40 on both sides is not necessary, and instead tightening of the bearing screw 40 on one side is sufficient for the mounting.

FIGS. 3 and 4 furthermore show by way of illustration a method for the mounting of a vehicle component 20 with a bearing bush system on a fastening portion 30 of a vehicle. In particular, a bearing bush 10 is provided which has an internal thread 11. The bearing bush 10 is accommodated in the bearing bush receptacle 21 of the vehicle component 20, wherein here the bearing bush 10 is in particular at least partially inserted into the bearing bush receptacle 21 until the holding elements 25 latch to or enter into engagement with the bearing bush 10 and hold same in the bearing bush receptacle. By this means, in particular falling of the bearing bush 10 out of the bearing bush receptacle 21 is prevented or blocked. An interaction or screwing of the bearing screw 40 with or into the internal thread 11 of the bearing bush 10, which is accommodated in the bearing bush receptacle 21, brings about an at least partial shifting of the bearing bush 10 along the axis A1 of the bearing bush 10. By this means, the bearing bush 10 at least partially enters into engagement with the fastening portion 30 or with the fastening portion 30 and the holding plate 27, as a result of which the vehicle component 20 is fastened to or mounted on the fastening portion 30 of the vehicle.

In the embodiment illustrated, the first stop surfaces 13 of the bearing bush 10 are at least partially in contact with the positioning element 24. By this means, the positioning elements 24 can be pressed against the fastening portion 30 by the shifted bearing bush 10, as a result of which secure mounting of the vehicle component 20 is ensured.

There is a first clearance between the bearing bush 10 and the fastening portion 30, the first clearance, however, may have a width of not more than approximately 2 mm, more particularly of not more than approximately 1 mm, most particularly of a maximum of approximately 0.2 mm. By this means, in particular wear of the fastening portion 30 during operation of the vehicle can be reduced. Furthermore, there is a second clearance between the second stop surface 14 and the screw head 41 of the bearing screw 10. By this means, it is possible to firmly tighten the bearing screw 40 and therefore to clamp the fastening portion 30 between the positioning elements 24 and the holding plate 27 or the screw head 41. The second clearance may have a width of no more than approximately 2 mm, more particularly of no more than approximately 1 mm, most particularly of a maximum of approximately 0.2 mm. In this connection, the second stop surface 14 also serves in particular as a protection device against overtensioning of the bearing screw 40, which could damage the bearing bush system, since the second stop surface 14 blocks further screwing in of the bearing screw 40 as soon as the second stop surface 14 enters into contact with the screw head 41.

Furthermore, it is possible to seal off the bearing bush system to the outside in a liquid or dust-tight manner. For this purpose, sealing means could be provided, for example between screw head 41 and holding plate 27 and/or between the first stop surface 13 and the positioning elements 24, which sealing means can be of encircling design for this purpose, and/or a liquid or dust-tight thread could be used.

The aspects mentioned above are, however, not only limited to the embodiments described in the above paragraphs and in the figures, but rather can each have any combination of the features described.

What is claimed is:

1. A vehicle component with a bearing bush system for mounting the vehicle component on a fastening portion of a vehicle, the vehicle component comprising:
    a holding plate of the vehicle component;
    a bearing bush comprising:
        an internal thread; and
        a bearing bush receptacle configured to at least partially accommodate the bearing bush,
    wherein the bearing bush comprises at least one fixing portion and the bearing bush receptacle comprises at least one fixing surface,
    wherein the bearing bush is configured to be at least partially shifted in the bearing bush receptacle by an interaction between the internal thread of the bearing bush and a bearing screw, in order to enter into engagement with the fastening portion,
    wherein, upon the interaction of the bearing screw with the internal thread of the bearing bush, the fixing portion enters into engagement with the at least one fixing surface in order to produce a rotational securing of the bearing bush within the bearing bush receptacle,
    wherein the fixing portion is configured, upon the interaction of the bearing screw with the internal thread of the bearing bush, to enter into engagement with the at least one fixing surface by cutting or biting into same,
    wherein the holding plate is designed such that the fastening portion is mounted between the bearing bush receptacle and the holding plate and, following the interaction with the internal thread of the bearing bush, the bearing screw at least partially extends through the holding plate, and
    wherein, following the interaction of the bearing screw with the internal thread of the bearing bush, the bearing bush extends at least partially into the holding plate.

2. The vehicle component as claimed in claim 1, wherein the bearing bush receptacle has at least one holding element designed to hold the bearing bush in the bearing bush receptacle prior to the interaction of the bearing screw with the internal thread of the bearing bush, and wherein the at least one holding element is at least partially elastic.

3. The vehicle component as claimed in claim 1, wherein the bearing bush has at least one first stop surface, the normal vector of which runs substantially parallel to an axis of the bearing bush, and
    wherein the bearing bush receptacle has at least one positioning element which is configured, upon the interaction of the bearing screw with the internal thread of the bearing bush to at least partially contact the at least one first stop surface.

4. The vehicle component as claimed in claim 1, wherein the bearing bush comprises, at one end of the bearing bush, at least one second stop surface, the normal vector of which runs substantially parallel to an axis of the bearing bush, and
    wherein the at least one second stop surface is designed, upon the interaction of the bearing screw with the internal thread of the bearing bush, to at least partially contact a screw head of the bearing screw.

5. The vehicle component as claimed in claim 1, wherein the bearing bush is formed integrally.

6. The vehicle component as claimed in claim 1, wherein the bearing bush is composed of at least one of a metal, a plastic, and a composite material.

\* \* \* \* \*